US010714953B1

(12) United States Patent
Solana et al.

(10) Patent No.: US 10,714,953 B1
(45) Date of Patent: Jul. 14, 2020

(54) CHARGING STAND FOR PERCUSSIVE MASSAGE DEVICE

(71) Applicant: Theragun, Inc., Beverly Hills, CA (US)

(72) Inventors: Jaime Sanchez Solana, Los Angeles, CA (US); Benjamin Nazarian, Beverly Hills, CA (US); Tiki Ho, Hong Kong (HK)

(73) Assignee: THERAGUN, INC., Beverly Hills, CA (US)

( * ) Notice: Subject to any disclaimer, the term of this patent is extended or adjusted under 35 U.S.C. 154(b) by 0 days.

(21) Appl. No.: 16/787,449

(22) Filed: Feb. 11, 2020

Related U.S. Application Data (60) Provisional application No. 62/899,098, filed on Sep. 11, 2019, provisional application No. 62/844,424, filed on May 7, 2019, provisional application No. 62/804,027, filed on Feb. 11, 2019.

(51) Int. Cl.
| | |
|---|---|
| *H01M 10/46* | (2006.01) |
| *H02J 7/00* | (2006.01) |
| *H02J 7/02* | (2016.01) |
| *H02J 50/00* | (2016.01) |
| *A61H 23/00* | (2006.01) |

(52) U.S. Cl.
CPC ............... *H02J 7/0044* (2013.01); *H02J 7/02* (2013.01); *H02J 50/005* (2020.01); *A61H 23/006* (2013.01)

(58) Field of Classification Search
CPC .......... H02J 7/355; H02J 7/0042; H02J 7/025; H02J 5/005; H02J 50/10; A61H 23/00

USPC ...... 320/107, 114, 115, 108; 601/84, 87, 89, 601/96
See application file for complete search history.

(56) References Cited

U.S. PATENT DOCUMENTS

| | | | | |
|---|---|---|---|---|
| 4,506,159 | A * | 3/1985 | Reuter | G01T 1/142 250/377 |
| 6,994,575 | B1 | 2/2006 | Clark | |
| 9,132,058 | B2 * | 9/2015 | Imboden | A61H 19/00 |
| 2006/0118841 | A1 * | 6/2006 | Eliason | H01L 27/11502 257/295 |
| 2011/0037431 | A1 * | 2/2011 | Mackle | H02J 7/0044 320/114 |

(Continued)

FOREIGN PATENT DOCUMENTS

EP 2328255 A1 6/2011

OTHER PUBLICATIONS

PowerA Joy Con & Pro Controller Charging Dock Nintendo Switch—Platform: Nintendo Switch.

(Continued)

*Primary Examiner* — Edward Tso
(74) *Attorney, Agent, or Firm* — Jeffer Mangels Butler & Mitchell LLP; Brennan C. Swain, Esq.

(57) ABSTRACT

A charging stand for use with a percussive massage device that includes a rechargeable battery. The charging stand includes a main body portion that defines a charging channel therein that is configured to receive the percussive massage device in a charging position. The main body portion includes first and second side walls, an upper wall and a lower wall that cooperate to define the charging channel. When a percussive massage device is received in the charging position, power is transmitted from the charging stand to the rechargeable battery.

15 Claims, 11 Drawing Sheets

(56) References Cited

U.S. PATENT DOCUMENTS

| | | | |
|---|---|---|---|
| 2012/0065556 A1* | 3/2012 | Smith | A61F 7/007 601/89 |
| 2013/0052871 A1* | 2/2013 | Eklind | H04M 1/04 439/620.21 |
| 2014/0097793 A1 | 4/2014 | Wurtz | |
| 2015/0098184 A1 | 4/2015 | Tsai | |
| 2016/0136037 A1* | 5/2016 | Cai | A61H 19/34 601/46 |

OTHER PUBLICATIONS

Unboxing: Joy-Con & Pro Controller Charging Dock for Nintendo Switch—You Tube, Feb. 26, 2018.
OIVO Xbox One Controller Charger Dual Charging Station Updated Strap, Remote Charger Dock—2 Rechargeable Battery Pack—Amazon.
International Search Report and Written Opinion issued in PCT/US20/17645.

\* cited by examiner

FIG. 13 ced tab and charging pin that are positioned in the vertical portion of the charging channel (or could be positioned in the horizontal portion). The charging pin extends outwardly from a charging pin slot. The charging pin is connected inside the main body portion to a cord that, at its opposite end, is connected to a female receptacle for connecting to an adapter that provides power from a wall outlet.

CHARGING STAND FOR PERCUSSIVE MASSAGE DEVICE

CROSS REFERENCE TO RELATED APPLICATIONS

This application claims priority to U.S. Provisional Patent Application No. 62/899,098, filed Sep. 11, 2019, U.S. Provisional Patent Application No. 62/844,424, filed May 7, 2019, and U.S. Provisional Patent Application No. 62/804,027, filed Feb. 11, 2019, the entireties of which are incorporated by reference herein.

FIELD OF THE INVENTION

The present invention relates generally to a charging stand for a battery powered percussive massage device.

BACKGROUND OF THE INVENTION

In order to recharge the battery in many percussive massage devices with rechargeable batteries, users are required to remove the battery and place it into a charger. Other devices require the user to insert the male end of a cord into the port in the device. A need exists for a charging device that allows the entire percussive massage device to be docked thereon.

SUMMARY OF THE PREFERRED EMBODIMENTS

In accordance with a first aspect of the present invention there is provided a charging stand for use with a percussive massage device that includes a rechargeable battery. The charging stand includes a main body portion that defines a charging channel therein that is configured to receive the percussive massage device in a charging position. The main body portion includes first and second side walls, an upper wall and a lower wall that cooperate to define the charging channel. When a percussive massage device is received in the charging position, power is transmitted from the charging stand to the rechargeable battery. In a preferred embodiment, the lower wall extends generally horizontally, and the lower wall extends upwardly from the lower wall.

In a preferred embodiment, the charging stand includes a charging pin positioned in the charging channel that is movable between a charging position and a safety position. In a preferred embodiment, the charging pin extends through a charging pin slot and into the charging channel, and the charging pin is movable between the charging position and the safety position within the charging pin slot. Preferably, the charging pin slot includes an angled stop surface, and when the charging pin is in the safety position, the charging pin contacts the angled stop surface. Preferably, the charging pin defines a charging pin axis and the lower surface extends parallel to the charging pin axis. In a preferred embodiment, the lower surface forms an angle of between 1° and 45° with a horizontal line.

In a preferred embodiment, the charging stand includes a retractable tab that is movable between a protection position where the retractable tab is positioned in the charging channel and a charging position where the retractable tab is at least partially retracted into the main body portion interior. The retractable tab is biased to the protection position and the charging pin is positioned adjacent the retractable tab. Preferably, the retractable tab includes a side surface adjacent the charging pin. The side surface includes a surface area that defines a surface area extended that extends transversely across the charging channel, wherein the charging pin is positioned in the surface area extended.

In a preferred embodiment, the charging stand includes a wireless charging transmitter. Preferably, the wireless charging transmitter is positioned on or in one of the first or second sidewalls.

In accordance with another aspect of the present invention there is provided a charging stand for use with a percussive massage device that includes a main body portion that defines a charging channel therein that is configured to receive the percussive massage device in a charging position, and a charging pin positioned in the charging channel. The charging pin is movable between a charging position and a safety position.

In accordance with another aspect of the present invention there is provided a charging stand for use with a percussive massage device that includes a main body portion that defines a charging channel therein and includes a main body portion interior. The charging channel is configured to receive the percussive massage device in a charging position.

The device also includes a charging pin positioned in the charging channel, and a retractable tab that is movable between a protection position where the retractable tab is positioned in the charging channel and a charging position where the retractable tab is at least partially retracted into the main body portion interior. The retractable tab is biased to the protection position and the charging pin is positioned adjacent the retractable tab. In a preferred embodiment, the retractable tab includes a contact surface. The retractable tab is pushed from the protection position to the charging position when the contact surface is contacted by the percussive massage device.

The present invention is a charging stand or dock that can be used with any device that includes a rechargeable battery. In a preferred embodiment, the charging stand is used with a percussive massage device, such as that shown and described in U.S. patent application Ser. Nos. 16/675,772, 29/674,838, 29/674,846, 29/674,836 and 62/899,098 the entireties of which are incorporated by reference herein.

In a preferred embodiment, the charging stand includes a main body portion having a charging cradle or channel defined therein. The charging channel includes a generally horizontal portion and a generally vertical portion for accommodating a percussive massage device in a recharging position. Preferably, the charging stand also includes a retractable tab and charging pin that are positioned in the vertical portion of the charging channel (or could be positioned in the horizontal portion). The charging pin extends outwardly from a charging pin slot. The charging pin is connected inside the main body portion to a cord that, at its opposite end, is connected to a female receptacle for connecting to an adapter that provides power from a wall outlet.

It should be appreciated that the purpose of the retractable tab and the charging pin slot is to protect the protruding charging pin from being damaged or broken if the percussive massage device is inserted into the charging channel improperly. To insert the percussive massage device properly, the device should be inserted in a general horizontal direction. When proper insertion occurs, the charging pin enters the charging port on the percussive massage device. Simultaneously, an exterior surface of the percussive massage device contacts the retractable tab and pushes it inwardly into the interior of the main body portion. The retractable tab is biased outwardly into the vertical portion of the charging channel (the normal position) and is held in the interior of the main body portion (the charging position) when the percussive massage device is in position to be charged.

If a user attempts to insert the percussive massage device from above, because the top surface of the retractable tab is higher than the charging pin, the retractable tab blocks the charging channel and prevents the percussive massage device from being able to be inserted, thereby protecting the charging pin.

The proper direction for removing the percussive massage device from the charging stand after charging is also in a generally horizontal direction (opposite to the insertion direction). However, as the percussive massage device is removed some users may have a tendency to pull upwardly slightly, thereby removing the percussive massage device at an angle. To protect the charging pin, the charging pin is able to move or pivot within charging slot. In a preferred embodiment, the charging slot includes an inclined surface at the top thereof that provides a stop for the pivoting of the charging pin. The charging pin normally extends outwardly approximately horizontally. The charging pin is biased toward the horizontal of charging position. Therefore, if the inclined surface has an angle of 30° from horizontal, the charging pin is able to pivot up to 30° upwardly to allow for a user pulling slightly upwardly on the percussive massage device as it is removed from the charging stand. And, once the charging pin exits the charging port on the device, the charging pin pivots back downwardly to its normal position. It will be appreciated that the angle of the inclined surface can be any angle between 1° and 89°, but is preferably between 15° and 60° and is most preferably between 20° and 45°. The pin itself prevents the device from being able to be pulled straight upwardly when attempting to remove the device. In another preferred embodiment, the charging stand includes two retractable tabs, one on either side of the retractable pin.

BRIEF DESCRIPTION OF THE DRAWINGS

Like numerals refer to like parts throughout the several views of the drawings.

DETAILED DESCRIPTION OF THE PREFERRED EMBODIMENTS

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Referring now to the drawings, wherein the showings are for purposes of illustrating the present invention and not for purposes of limiting the same, FIGS. 1-13 show embodiments of charging stands in accordance with a preferred embodiment of the present invention.

Figure 1:
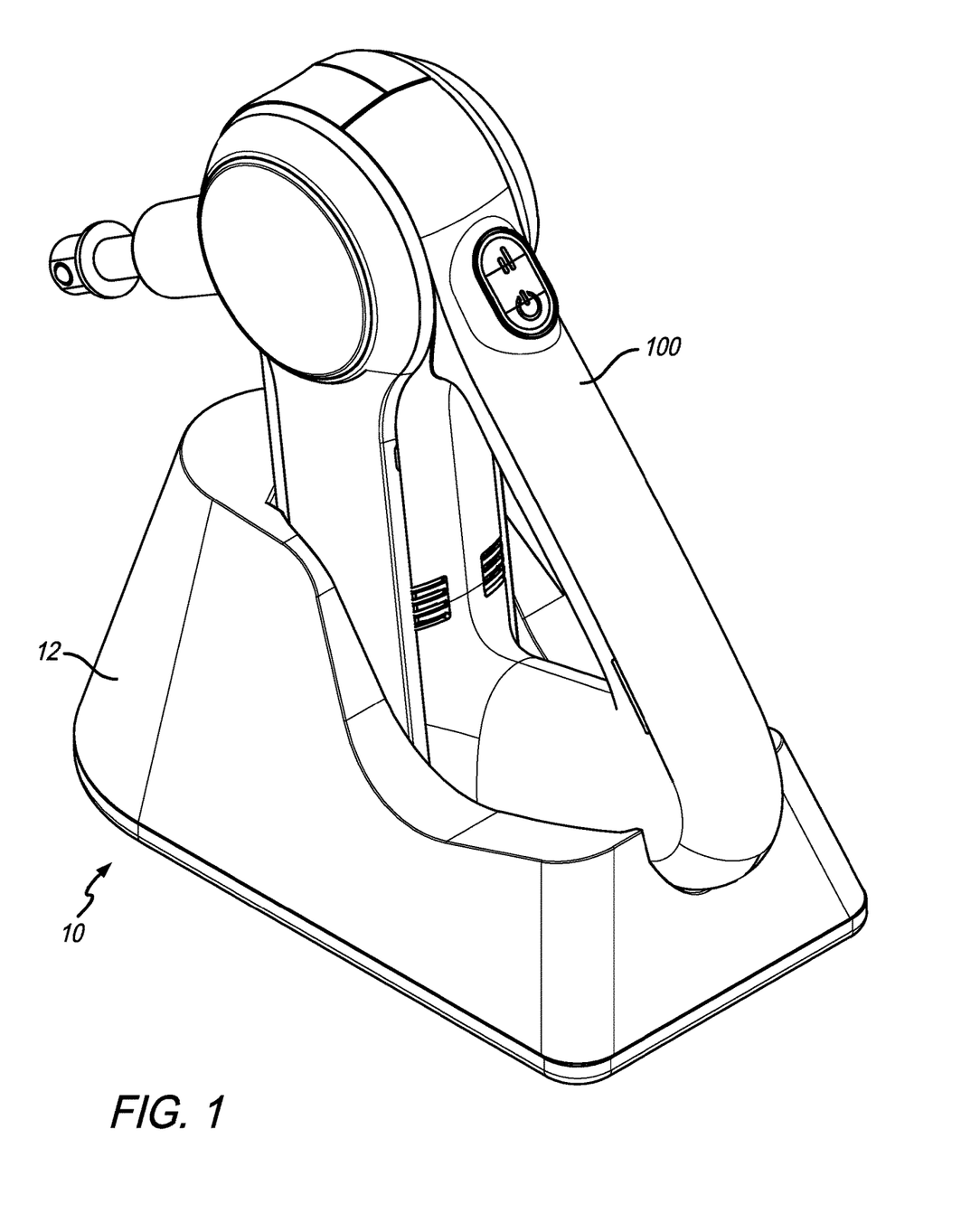
FIG. 1 is a perspective view of a charging stand with a percussive massage device positioned therein in accordance with a preferred embodiment of the present invention.

FIGS. 1-4 show a preferred embodiment of a percussive massage device 100 and charging stand 10 that includes a main body portion 12 having a charging cradle or channel 14 defined therein. The charging channel 14 includes a lower portion 16 and an upper portion 18 that are defined by one or more sidewalls 19, upper surface or wall 21 and lower surface or wall 23. In an embodiment where the charging channel 14 is round (see, e.g., FIG. 8), a single sidewall 19 and/or upper wall 21 and lower wall 23 can define the channel 14. It will be appreciated that the charging cradle 14, together with the upper and lower portions and sidewalls cooperate to accommodate the percussive massage device 100 in a recharging position, as shown in FIG. 1.

Figure 2:
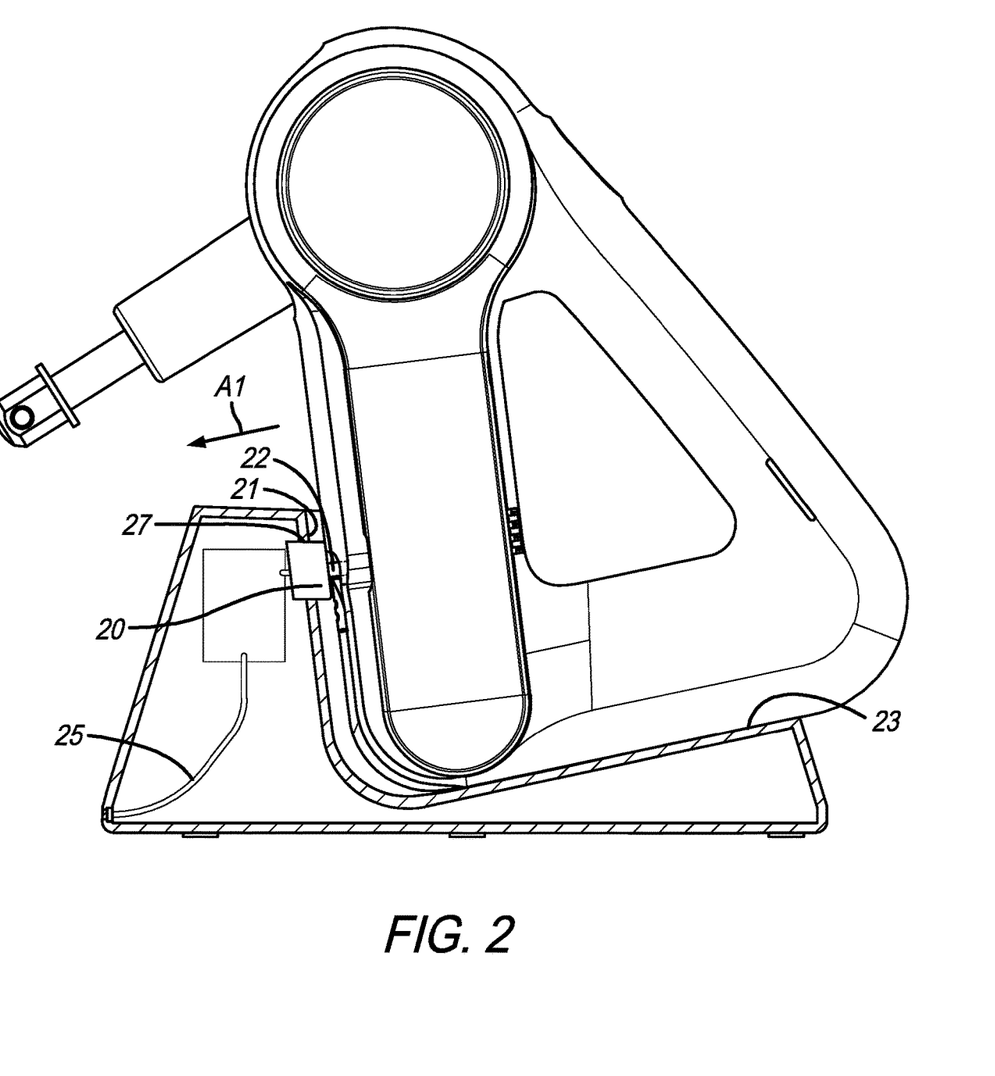
FIG. 2 is a side cross-sectional view of the charging stand of FIG. 1 showing the percussive massage device being inserted in the proper direction.
Figure 3:
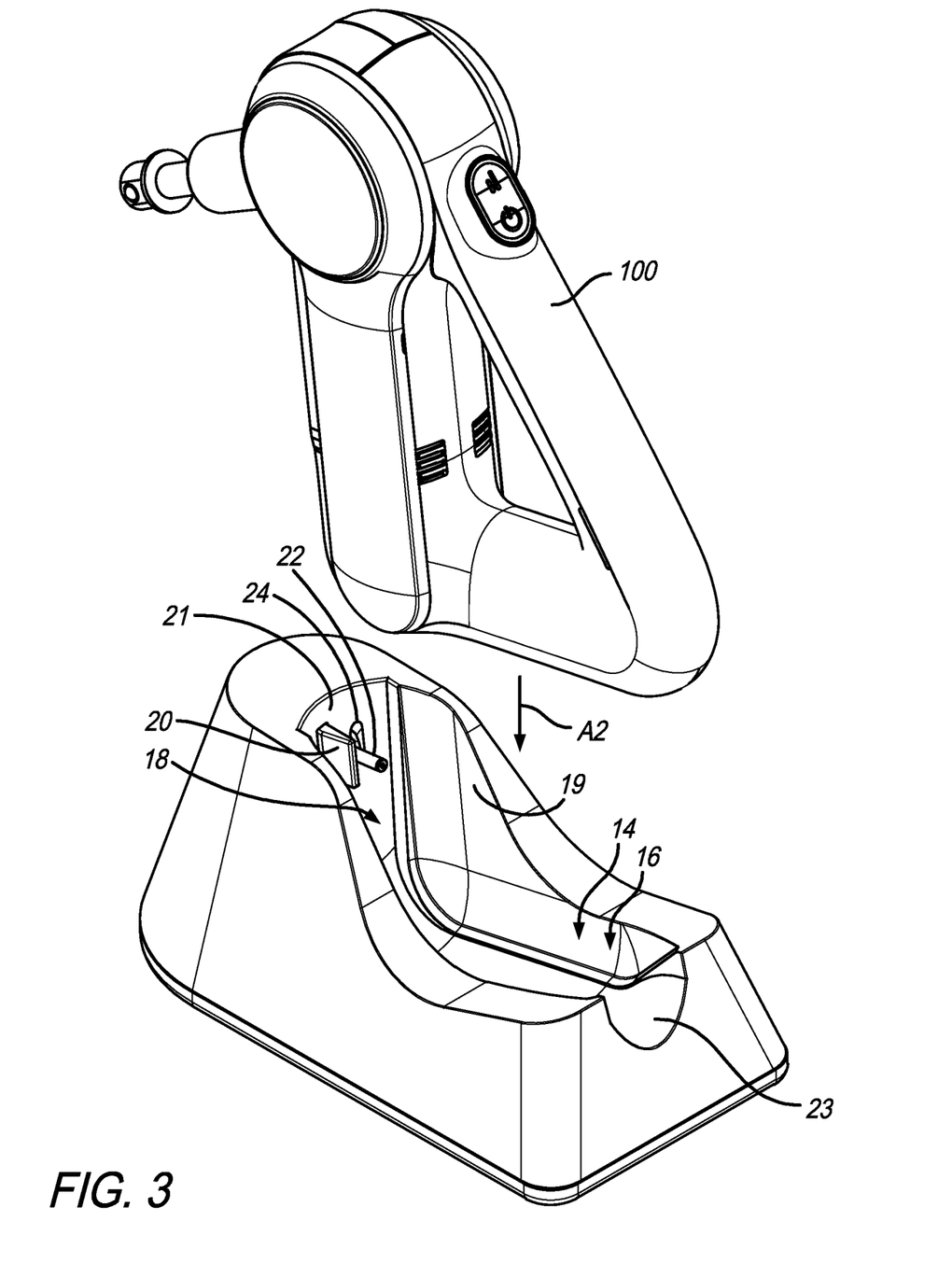
FIG. 3 is a perspective view of the charging stand of FIG. 1 and showing the percussive massage device being inserted in an improper direction.
Figure 4:
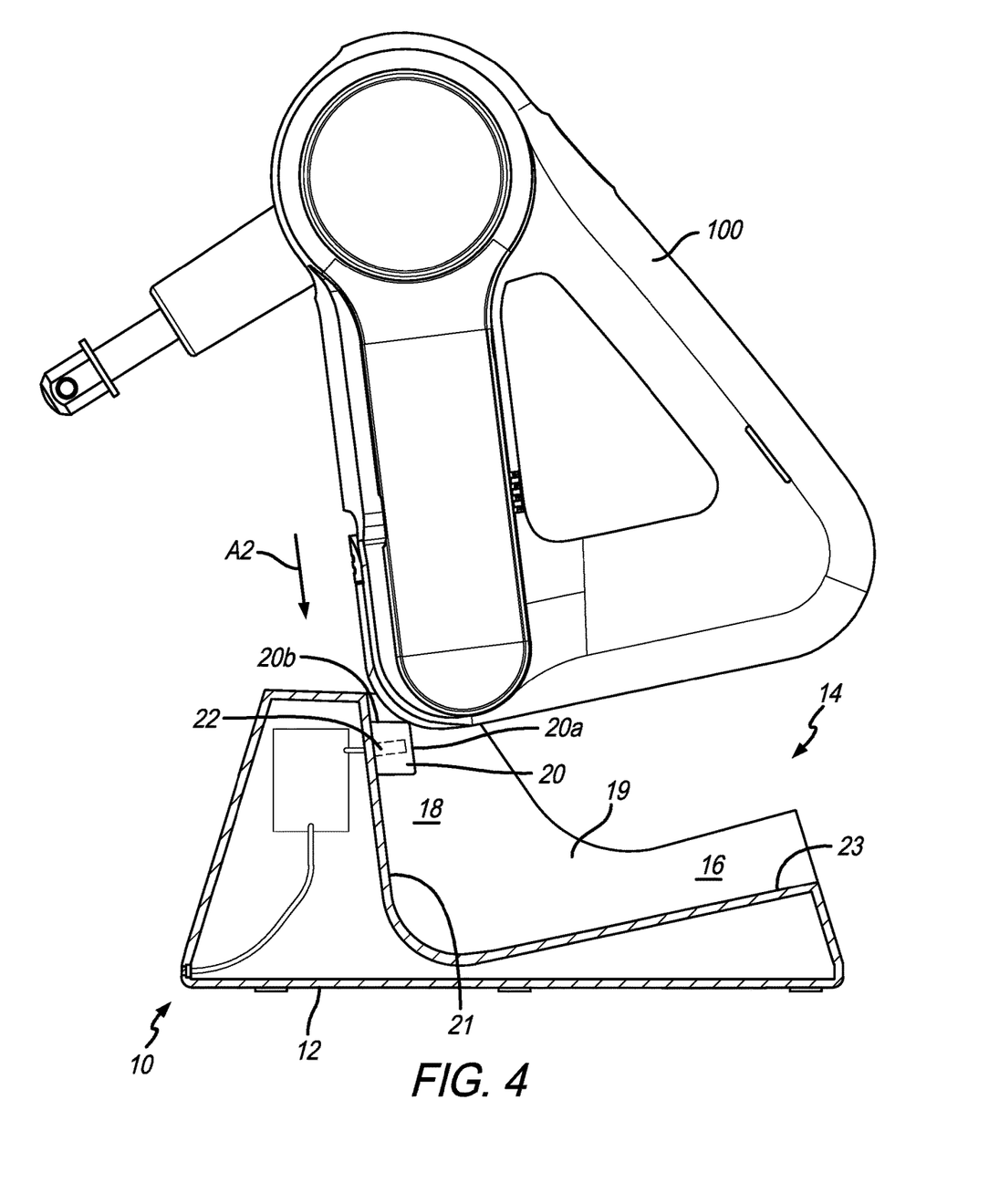
FIG. 4 is a side cross-sectional view of the charging stand of FIG. 1 showing the percussive massage device being inserted in an improper direction.

As shown in FIGS. 2-4, in a preferred embodiment, the charging stand 10 includes a retractable tab 20 and charging pin 22 that are positioned in the charging channel 14. The embodiment of FIG. 2 shows the retractable tab 20 and charging pin 22 positioned on the upper portion 18 of the charging channel 14. However, they can also be positioned in the lower portion 16 of the charging channel 14. The charging pin 22 extends outwardly from a charging pin slot 24. The charging pin 22 provides a charge to the battery of a percussive massage device positioned in the charging channel 14. For example, the charging pin 22 may be connected inside the main body portion 12 to a wire 25 that, at its opposite end, is connected to a female receptacle or USB connector for connecting to an adapter that provides power from a wall outlet.

The purpose of the retractable tab 20 and the charging pin slot 24 is to protect the charging pin 22 from being damaged or broken if the percussive massage device 100 is inserted into the charging channel 14 improperly. As shown in FIG. 2, to insert the percussive massage device 100 properly, the device 100 should be inserted in a generally horizontal direction as shown by arrow A1 in FIG. 2. It will be appreciated that generally horizontal means any angle that is less than 45° with the horizontal. For example arrow A1 in FIG. 2 is not exactly horizontal, but it is generally horizontal (more horizontal than vertical). It will be appreciated that generally vertical means any angle that is less than greater than 45° with the horizontal. For example arrow A2 in FIG. 4 is not exactly vertical, but it is generally vertical (more vertical than horizontal). Also, as shown in FIG. 2, lower wall 23 is generally horizontal and upper wall 21 is generally vertical (or extends generally upwardly from the lower wall 23). Preferably, the lower wall 23 is slightly angled so the percussive massage device slides down the lower wall 23 toward the charging pin 22 (or, at least gravity helps it move toward the charging pin as a result of the angle). When proper insertion occurs, the percussive massage device 100 contacts the outer or contact surface 20a of the retractable tab and pushes the retractable tab 20 inwardly so that the charging pin 22 enters the charging port on the percussive massage device 100. In other words, an exterior surface of the percussive massage device 100 contacts the contact surface 20a of the retractable tab 20 and pushes it through a tab opening 27 in the upper wall 21 (or lower wall 23) and inwardly into the interior of the main body portion 12. The retractable tab 20 is movable between a protection position (see FIG. 3) where the retractable tab is positioned in the charging channel 14 and a charging position where the retractable tab is at least partially retracted into the main body portion interior. The retractable tab 20 is biased to the protection position. The retractable tab 20 is biased outwardly (e.g., via a spring) into the upper portion 18 of the charging channel 14 (the normal position) and is retracted at least partially into the interior of the main body portion 12 (the charging position) when the percussive massage device 100 is in position to be charged. FIG. 2 shows the retractable tab 20 partially retracted or pushed in.

Figure 5:
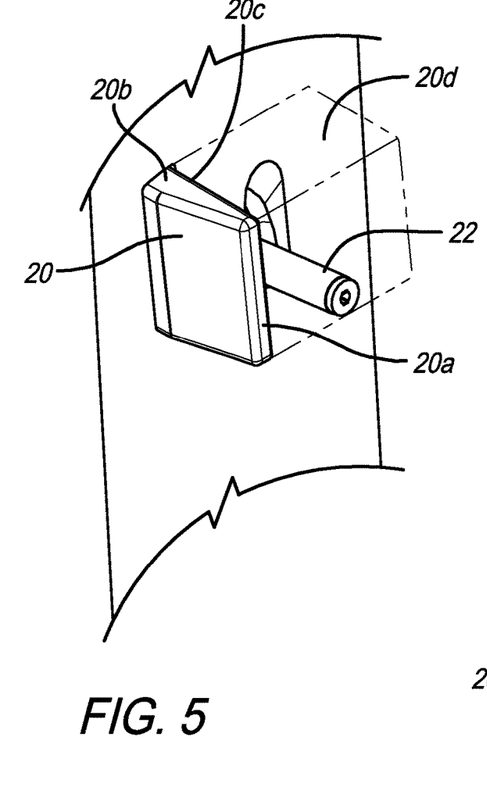
FIG. 5 is a perspective view showing the surface area extended in phantom lines.

As shown in FIGS. 3-4, if a user attempts to insert the percussive massage device 100 from above in a generally vertical direction (see arrow A2 in FIGS. 3 and 4), because the top surface 20b of the retractable tab 20 is positioned higher on the upper wall 21 than the charging pin 22, the retractable tab 20 blocks the upper portion 18 of the charging channel 14 and prevents the percussive massage device 100 from being able to be inserted, thereby protecting the charging pin 22. As shown in FIG. 5, the retractable tab 20 includes a side surface 20c adjacent the charging pin 22. The side surface includes a surface area that defines a surface area extended volume 20d (defined by phantom lines in FIG. 5) that extends transversely across the charging channel 14. The charging pin 22 is positioned in the surface area extended 20d so that it is protected from incorrect insertion of the percussive massage device. FIG. 4 shows the charging pin 22 in hidden lines behind the retractable tab 20. This shows how the charging pin 22 is protected within the side surface extended volume.

Figure 6:
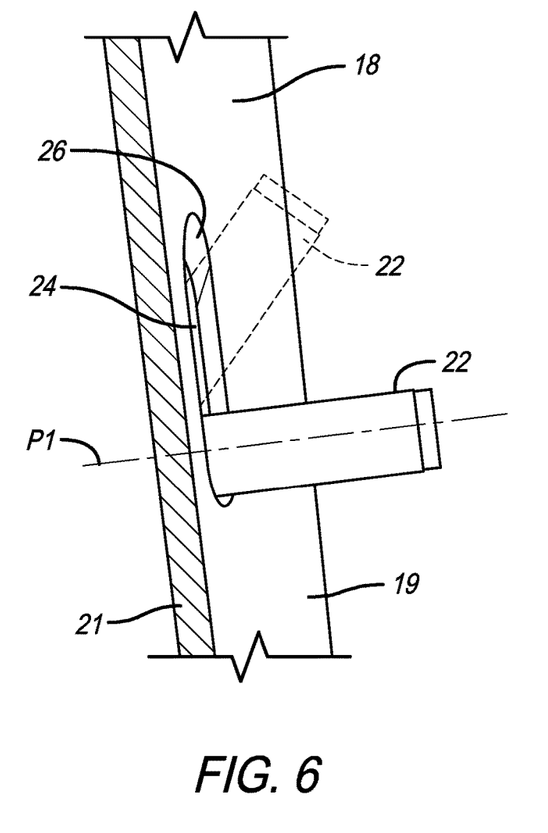
FIG. 6 is a detailed cross-sectional view of the charging pin.

The proper direction for removing the percussive massage device 100 from the charging stand 10 after charging is also in a generally horizontal direction opposite to arrow A1. However, as the percussive massage device 100 is removed some users may have a tendency to pull upwardly slightly, thereby removing the percussive massage device 100 at an angle that is greater than the angle defined between an axis defined by the charging pin (the charging pin axis P1, shown in FIG. 5) and the horizontal. To protect the charging pin 22, the charging pin 22 is able to move or pivot within charging slot 24. As shown in FIG. 6, the charging pin is movable between a charging position (shown in solid lines) and a safety position (shown in hidden lines). In a preferred embodiment, the charging slot 24 includes an angled or inclined stop surface 26 at the top thereof that provides a stop for the pivoting of the charging pin 22. The charging pin 22 normally extends outwardly, as shown in FIGS. 4-6, from a bottom of the charging slot 24. The charging pin 22 is biased toward the bottom of the charging slot (the normal position), e.g., by a spring. In a preferred embodiment, the charging pin axis P1 and the lower wall 23 are parallel. FIG. 6 shows the charging pin 22 in solid lines in the charging position and in hidden lines in the safety position. It will be appreciated that the safety position is not a single position, but any position where the charging pin 22 is pivoted upwardly as it is removed from the percussive massage device charging port. Once the charging pin 22 exits the charging port on the device, it pivots back downwardly to its normal position. It will be appreciated that the angle of the angled stop surface 26 can be any angle between 1° and 89°, but is preferably between 15° and 60° and is most preferably between 20° and 45°. The pin 22 itself prevents the device from being able to be pulled straight upwardly when attempting to remove the percussive massage device from the charging channel 14.

Figure 7:
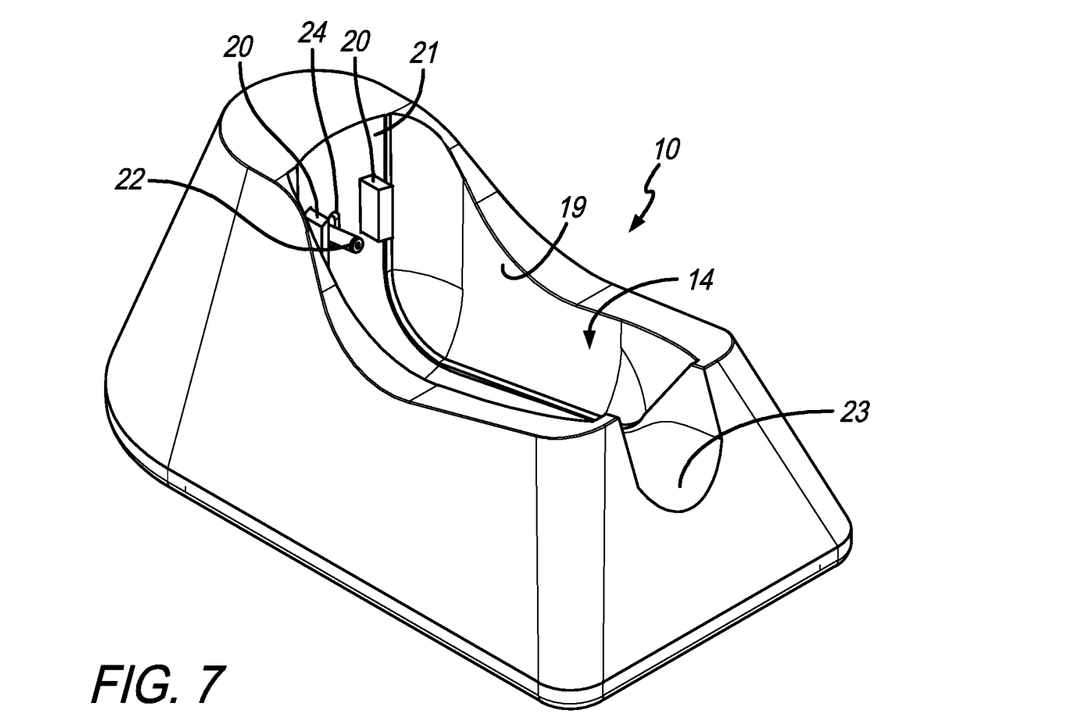
FIG. 7 is a perspective view of a charging stand in accordance with another a preferred embodiment of the present invention.
Figure 8:
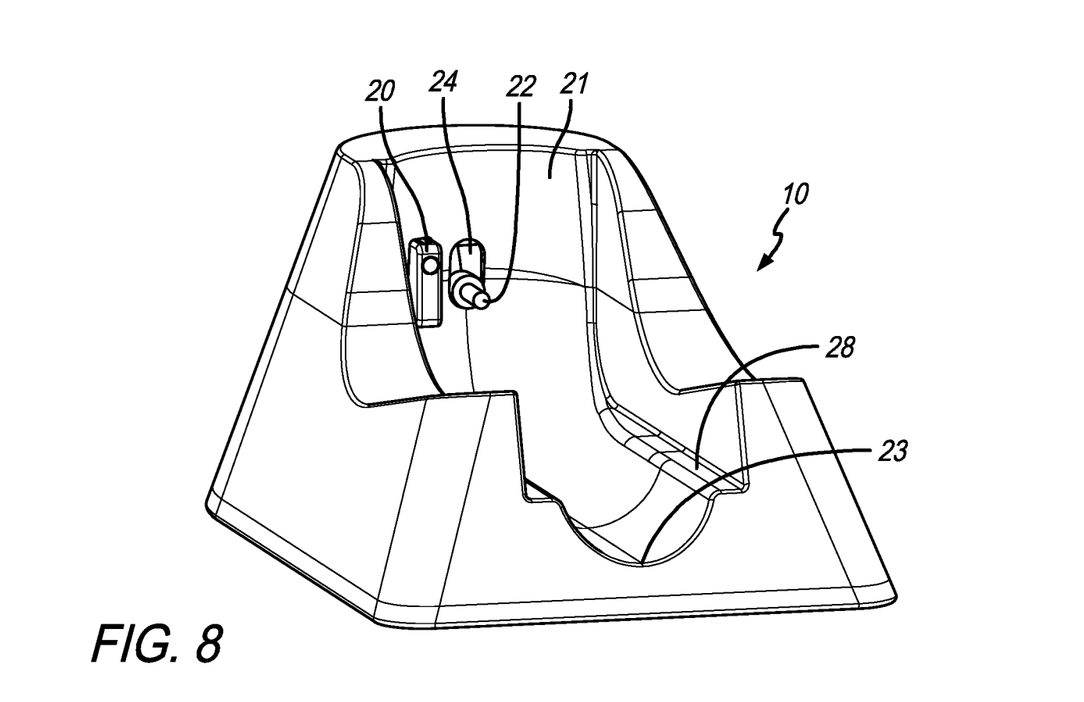
FIG. 8 is a perspective view of a charging stand in accordance with another a preferred embodiment of the present invention.

FIG. 7 shows another embodiment of a charging stand 10 with two retractable tabs 20 on either side of the retractable pin 22. FIG. 8 shows another embodiment of a charging stand 10 with a retractable tab 20 with a different shape than the tab of FIG. 1. FIG. 8 also includes ledges 28 that support surfaces on the percussive massage device used with the charging stand.

Figure 9:
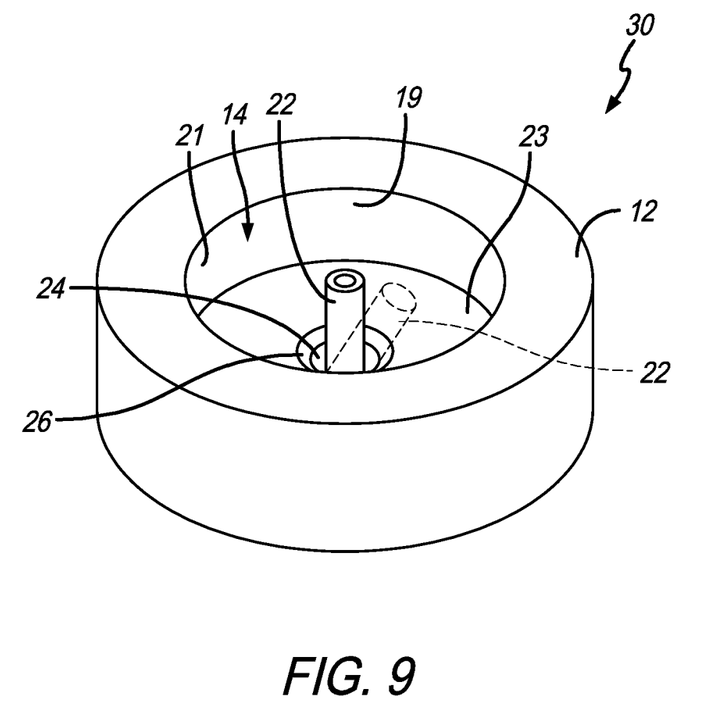
FIG. 9 is a perspective view of a charging stand in accordance with another a preferred embodiment of the present invention.

FIG. 9 shows another embodiment of a charging stand 30 that includes a main body portion 12, a charging channel 14, lower wall 23, upper wall 21, charging pin slot or opening 24 and included surface 26. FIG. 9 shows the charging pin 22 in solid lines in the charging position and in hidden lines in the safety position. In use, the percussive massage device or battery thereof is inserted downwardly into charging channel 14. If it is inserted incorrectly and the charging pin 22 is not received in the charging port of the device, the charging pin 22 can pivot in any direction, up to 360°, to protect the charging pin 22. The charging pin 22 is biased to the charging position (which is generally horizontal).

Figure 10:
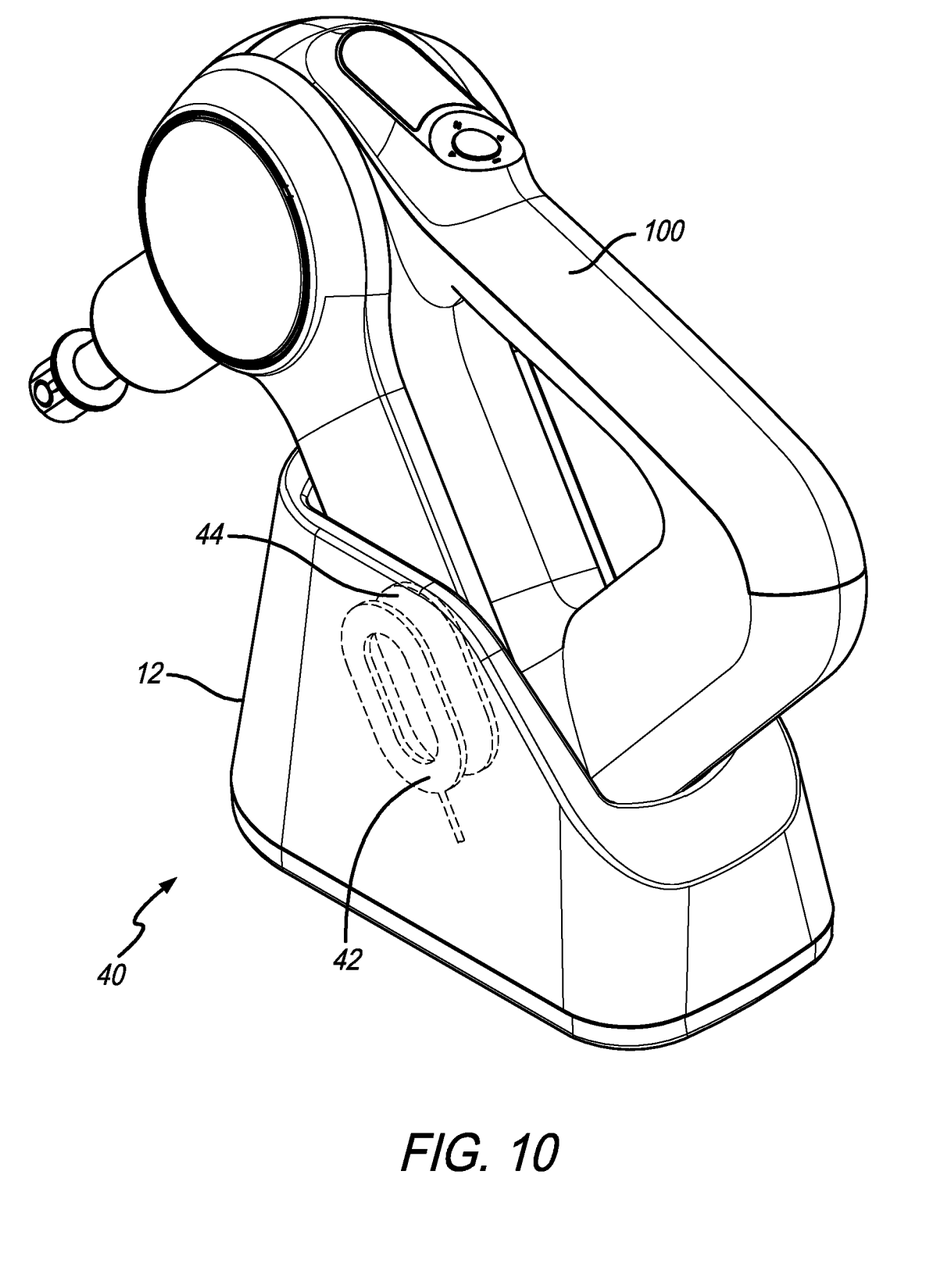
FIG. 10 is a perspective view of a wireless charging stand with a percussive massage device positioned therein in accordance with a preferred embodiment of the present invention.
Figure 11:
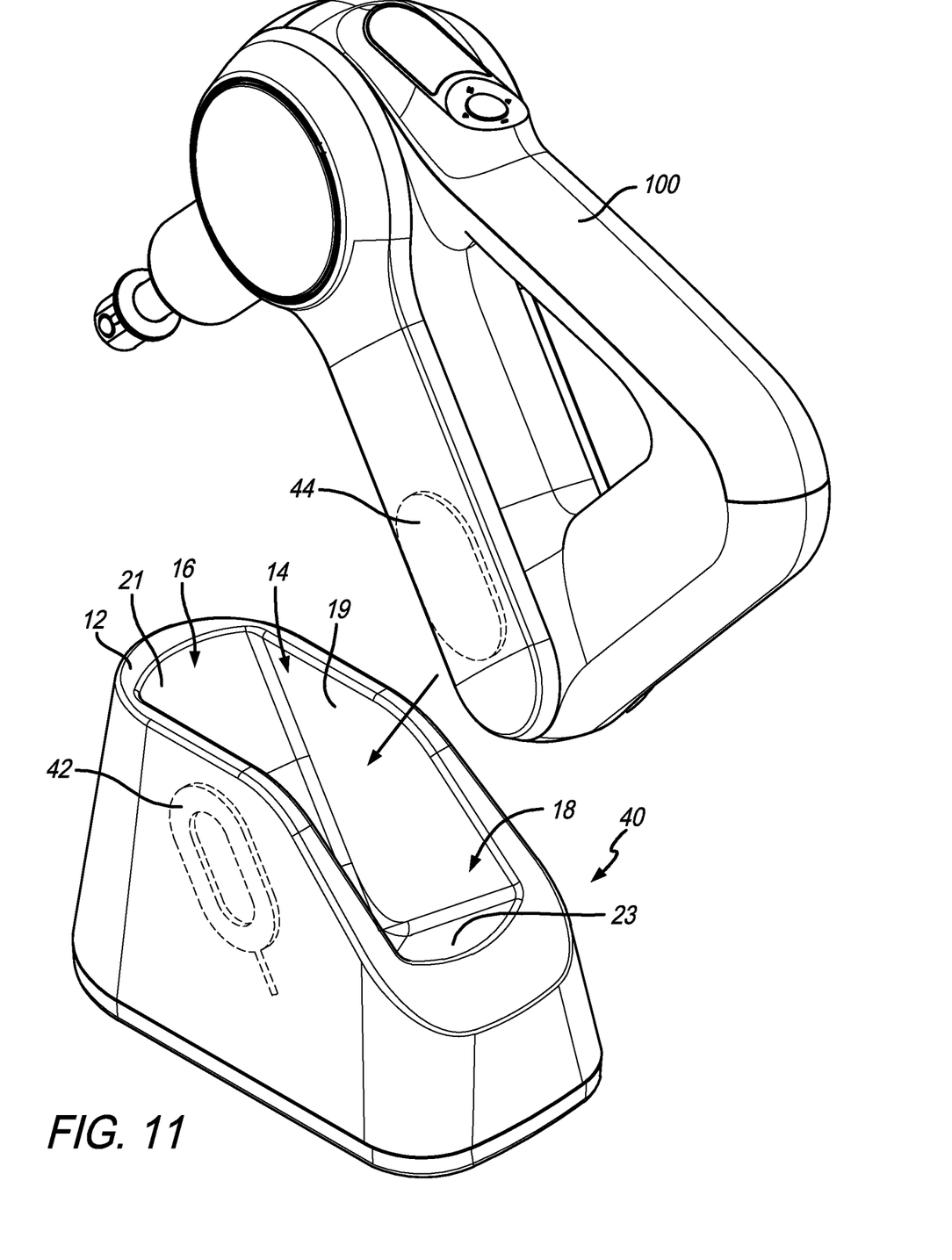
FIG. 11 is a perspective view of the charging stand of FIG. 10 with the percussive massage device exploded therefrom.
Figure 12:
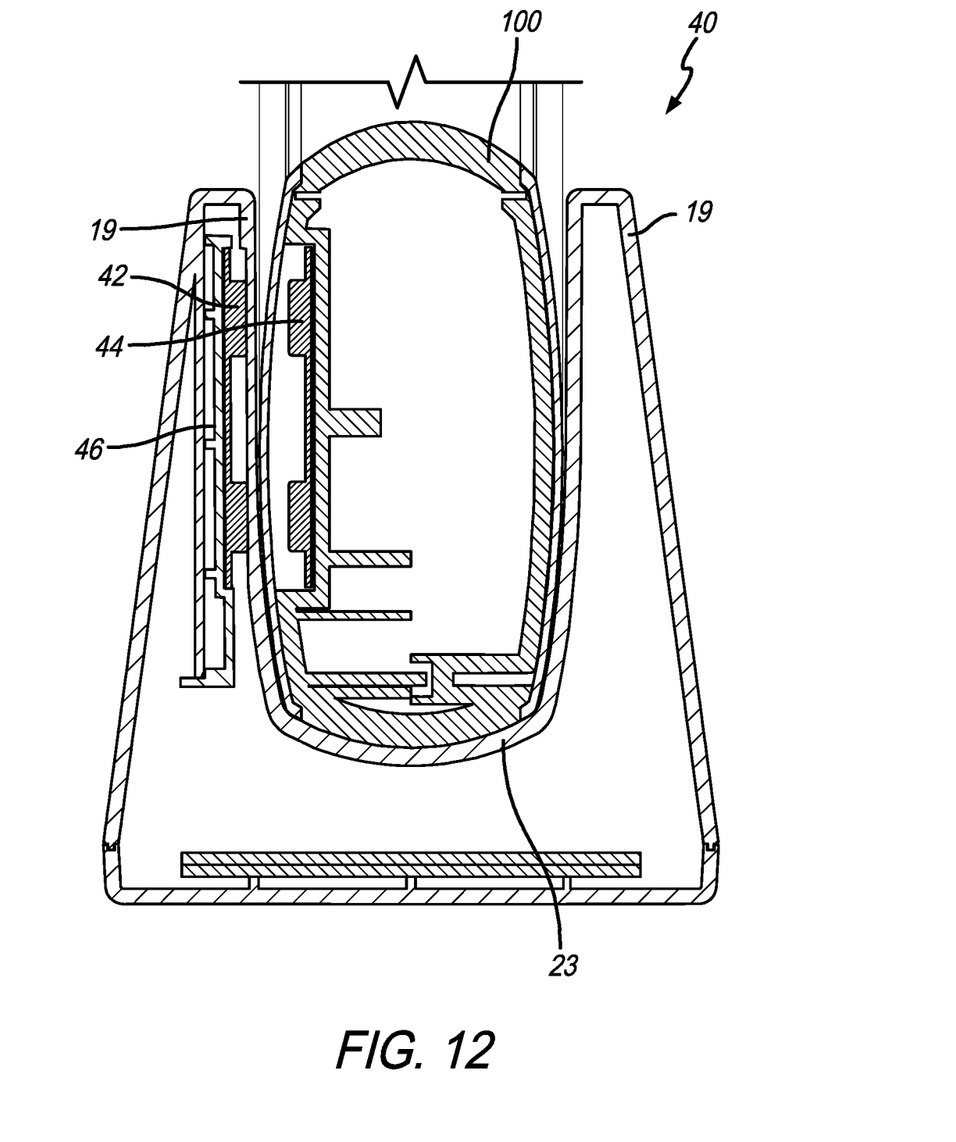
FIG. 12 is a cross-sectional view of the charging stand of FIG. 10.
Figure 13:
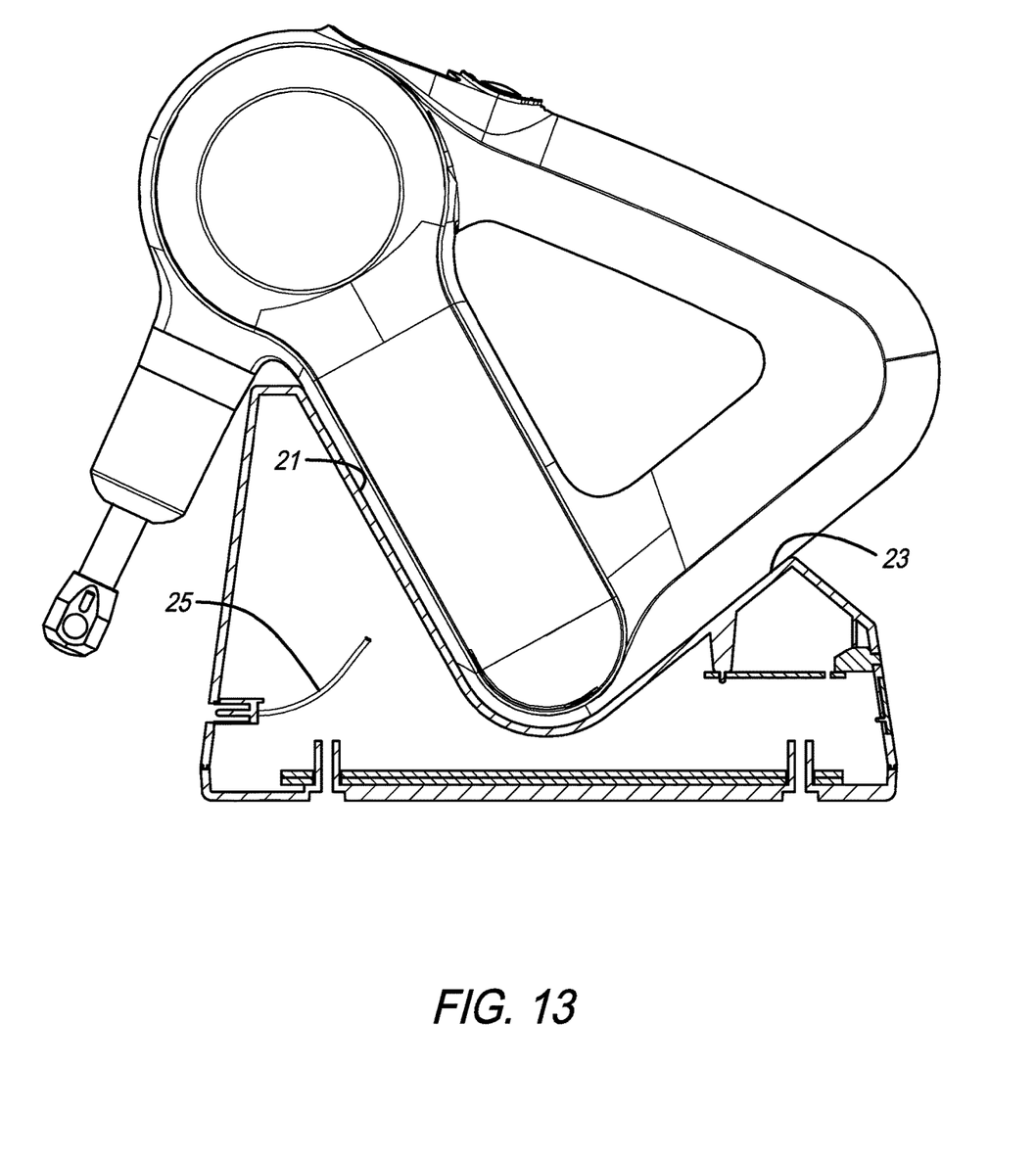
FIG. 13 is another-sectional view of the charging stand of FIG. 10.

FIGS. 10-12 show a preferred embodiment of another charging stand 40 for a percussive massage device 100. Preferably, charging stand 40 includes wireless charging capability. As shown in FIGS. 10-12, charging stand 40 includes a main body portion 12 having a charging cradle or channel 14 defined therein. The charging channel 14 includes a lower portion 16 and an upper portion 18 that are defined by one or more sidewalls 19, upper surface or wall 21 and lower surface or wall 23.

In a preferred embodiment, the charging stand 40 includes a transmitter 42 positioned therein and the percussive massage device 100 includes a receiver 44 therein. The transmitter 42 can be positioned in the charging stand 40 at a location adjacent the receiver 44 in the percussive massage device. As shown in FIGS. 11-12, in a preferred embodiment, the transmitter 42 is positioned in or on one of the side walls 19, such that when the percussive massage device 100 is received in the charging channel 14, the receiver 44 located in the percussive massage device is positioned adjacent to and aligned with the transmitter 42. In a preferred embodiment, a support bracket 46 is secured in the stand interior and the sidewall 19. The support bracket 46 supports and positions the transmitter 42. In another embodiment, the transmitter can be positioned on the opposite side wall or adjacent the upper surface or wall 21 and lower surface or wall 23. It will be appreciated that the transmitter 42 is in electrical communication with a power source and the receiver 44 is in electrical communication with the rechargeable battery in the percussive massage device.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers or dimensions noted herein are only examples: alternative implementations may employ differing values, measurements, dimensions or ranges.

The teachings of the disclosure provided herein can be applied to other systems, not necessarily the system described above. The elements and acts of the various embodiments described above can be combined to provide further embodiments. Any measurements described or used herein are merely exemplary and not a limitation on the present invention. Other measurements can be used. Further, any specific materials noted herein are only examples: alternative implementations may employ differing materials.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A charging stand for use with a percussive massage device that includes a rechargeable battery, the charging stand comprising:

a main body portion that defines a charging channel therein, wherein the charging channel is configured to receive the percussive massage device in a charging position, wherein the main body portion includes opposing first and second side walls, an upper wall and a lower wall that cooperate to define the charging channel, wherein the upper and lower walls are positioned between the opposing first and second side walls, wherein the upper and lower walls form a V-shape and are configured to receive the percussive massage device thereon, wherein the first side wall includes an inner portion and an outer portion, wherein the main body portion defines a stand interior, and wherein a portion of the stand interior is defined between the inner and outer portions, a support bracket positioned in the stand interior and between the inner and outer portions of the first sidewall, and a wireless charging transmitter that is supported by the support bracket, and wherein when a percussive massage device is received in the charging position, power is transmitted from the charging stand to the rechargeable battery.

2. The charging stand of claim 1 wherein the support bracket is secured to the first side wall and includes an outer side, a portion of which is spaced from the outer portion of the first side wall, and in inner side that supports the support bracket.

3. A charging stand for use with a percussive massage device, the charging stand comprising:

a main body portion that defines a charging channel therein, wherein the charging channel is configured to receive the percussive massage device in a charging position, a charging pin positioned in the charging channel, wherein the charging pin is movable between a charging position and a safety position, wherein the charging pin is biased to the charging position.

4. The charging stand of claim 3 wherein the charging pin extends through a charging pin slot and into the charging channel, wherein the charging pin is movable between the charging position and the safety position within the charging pin slot.

5. The charging stand of claim 4 wherein the charging pin slot includes an angled stop surface, and wherein when the charging pin is in the safety position, the charging pin contacts the angled stop surface.

6. The charging stand of claim 3 wherein the main body portion includes a lower surface that partially defines the charging channel, wherein the charging pin defines a charging pin axis, wherein the lower surface extends parallel to the charging pin axis.

7. The charging stand of claim 6 wherein the lower surface forms an angle of between 1° and 45° with a horizontal line.

8. The charging stand of claim 3 further comprising a retractable tab that is movable between a protection position where the retractable tab is positioned in the charging channel and a charging position where the retractable tab is at least partially retracted into the main body portion interior, wherein the retractable tab is biased to the protection position, and wherein the charging pin is positioned adjacent the retractable tab.

9. The charging stand of claim 8 wherein the retractable tab includes a side surface adjacent the charging pin, wherein the side surface includes a surface area that defines a surface area extended that extends transversely across the charging channel, wherein the charging pin is positioned in the surface area extended.

10. The charging stand of claim 3 wherein in both the charging position and the safety position the charging pin is positioned in the charging channel.

11. The charging stand of claim 3 wherein the charging pin is pivotable between the charging position and the safety position.

12. A charging stand for use with a percussive massage device, the charging stand comprising:

a main body portion that defines a charging channel therein and includes a main body portion interior, wherein the charging channel is configured to receive the percussive massage device in a charging position, a charging pin positioned in the charging channel, and a retractable tab that is movable between a protection position where the retractable tab is positioned in the charging channel and a charging position where the retractable tab is at least partially retracted into the main body portion interior, wherein the retractable tab is biased to the protection position, and wherein the charging pin is positioned adjacent the retractable tab.

13. The charging stand of claim 12 wherein the retractable tab includes a side surface adjacent the charging pin, wherein the side surface includes a surface area that defines a surface area extended that extends transversely across the charging channel, wherein the charging pin is positioned in the surface area extended.

14. The charging stand of claim 12 wherein the retractable tab includes a contact surface, wherein the retractable tab is pushed from the protection position to the charging position when the contact surface is contacted by the percussive massage device.

15. The charging stand of claim 12 wherein the charging pin is movable between a charging position and a safety position.

* * * * *